(12) United States Patent
Umbarkar et al.

(10) Patent No.: US 10,467,372 B2
(45) Date of Patent: Nov. 5, 2019

(54) IMPLEMENTING AUTOMATED IDENTIFICATION OF OPTIMAL SENSE POINT AND SECTOR LOCATIONS IN VARIOUS ON-CHIP LINEAR VOLTAGE REGULATOR DESIGNS

(71) Applicant: International Business Machines Corporation, Armonk, NY (US)

(72) Inventors: Anurag P. Umbarkar, Austin, TX (US); Erich C. Schanzenbach, Dover Plains, NY (US); Howard H. Smith, Beacon, NY (US); Raju Balasubramanian, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 130 days.

(21) Appl. No.: 15/664,020

(22) Filed: Jul. 31, 2017

(65) Prior Publication Data
US 2019/0034573 A1    Jan. 31, 2019

(51) Int. Cl.
*G06F 17/50* (2006.01)

(52) U.S. Cl.
CPC .................. *G06F 17/5072* (2013.01)

(58) Field of Classification Search
CPC ........... G05B 2219/35001; G05B 2219/37434; G05B 23/0294; G05B 19/042; G06N 5/046; H04B 17/309; H04L 1/0041; Y02P 80/114; Y02P 90/02; G06F 17/5072
USPC ................. 716/132–136
See application file for complete search history.

(56) References Cited

U.S. PATENT DOCUMENTS

| | | | |
|---|---|---|---|
| 7,240,304 B2 * | 7/2007 | Dutta | G01R 31/3004 716/113 |
| 7,720,621 B2 | 5/2010 | Weekly | |
| 8,458,641 B2 | 6/2013 | Tang et al. | |
| 8,841,893 B2 | 9/2014 | Bulzacchelli et al. | |
| 8,988,140 B2 | 3/2015 | Graf et al. | |
| 9,582,622 B1 | 2/2017 | Balasubramanian et al. | |
| 9,607,118 B1 | 3/2017 | Balasubramanian et al. | |
| 2008/0054724 A1 | 3/2008 | Hosomi et al. | |
| 2008/0129324 A1 | 6/2008 | Pastel | |
| 2012/0179301 A1 * | 7/2012 | Aivaliotis | H02J 3/00 700/286 |
| 2015/0051744 A1 * | 2/2015 | Mitra | G06Q 50/06 700/286 |
| 2015/0121052 A1 | 4/2015 | Emma et al. | |

OTHER PUBLICATIONS

IBM (2004). Self adjusting power scheme for optimal power reduction. IBM TDB, IPCOM000031185D.

* cited by examiner

*Primary Examiner* — Binh C Tat
(74) *Attorney, Agent, or Firm* — Joan Pennington

(57) ABSTRACT

A method and system for implementing automated identification of optimal sense point (SP) and sector locations in various on-chip linear voltage regulator designs. A customized cost function is used along with predefined performance metrics to identify optimal SP and sector locations, under user-defined design constraints. The SP and sector locations are updated based on the identified optimization results, and the updated SP and sector locations are applied to an on-chip linear voltage regulator design to provide enhanced regulator performance and to ensure proper operation.

18 Claims, 5 Drawing Sheets

300

|     | W1 | W2 | ... | WN | Σ Cost |
|-----|----|----|-----|----|--------|
| SP1 | 1  | 3  |     | 2  | 6      |
| SP2 | 3  | 1  |     | 1  | 5      |
| ... |    |    |     |    |        |
| SPn | 2  | 3  |     | 1  | 6      |

FIG. 3

IMPLEMENTING AUTOMATED IDENTIFICATION OF OPTIMAL SENSE POINT AND SECTOR LOCATIONS IN VARIOUS ON-CHIP LINEAR VOLTAGE REGULATOR DESIGNS

FIELD OF THE INVENTION

The present invention relates generally to the data processing field, and more particularly, relates to a method and system for implementing automated identification of optimal sense point (SP) and sector locations in various on-chip linear voltage regulator designs.

DESCRIPTION OF THE RELATED ART

On-chip supply voltage in different regions of a regulated area varies due to resistive losses (IR) drops based on workload activity in various on-chip linear voltage regulator designs. A feedback mechanism is essential to compensate for such variations and ensure precise regulation.

Using a single sense point Single-Sector Single-Sense, (SSSS), the on-chip voltage regulation module (VRM) scales the voltage uniformly over the entire area, with no local control. This can cause high gradients for regions farther away from the SP. Also, the minimum voltage on the chip (Vmin) can drop significantly below the target voltage (Vtarget).

Improved results can be obtained by using multiple sense points. Using a Single-Sector Multi-Sense (SSMS) regulation scheme, the SP closest to the hotspot is chosen and voltage is scaled uniformly over the entire area. Since the chosen SP is close to the hotspot, Vmin stays close to Vtarget and ensures proper operation of devices on the chip.

To further improve the regulation accuracy, the chip area is divided into different sectors that each contain one or more sense points Multi-Sector Multi-Sense (MSMS). These sectors are regulated independently to minimize gradients between different regions of the chip.

For each of these regulation schemes (SSSS, SSMS, MSMS), a key factor that decides the efficiency and accuracy of regulation is the location of SPs and sectors.

A need exists for an effective method and system for implementing optimal sense point and sector locations in various on-chip linear voltage regulator designs to provide enhanced regulator performance and to ensure proper operation. It is desirable to provide an optimization scheme that automates the process of identifying optimal sense point and sector locations for a particular regulation scheme and workload, using a group of well-chosen metrics.

SUMMARY OF THE INVENTION

Principal aspects of the present invention are to provide a method and system for implementing automated identification of optimal sense point and sector locations in various on-chip linear voltage regulator designs. Other important aspects of the present invention are to provide such method, and system substantially without negative effects and that overcome many of the disadvantages of prior art arrangements.

In brief, a method and system for implementing automated identification of optimal sense point (SP) and sector locations in various on-chip linear voltage regulator designs. A customized cost function is used along with predefined performance metrics to identify optimal SP and sector locations, under user-defined design constraints. The SP and sector locations are updated based on the identified optimization results, and the updated SP and sector locations are applied to an on-chip linear voltage regulator design to provide enhanced regulator performance and to ensure proper operation. This optimization is performed separately for each voltage domain.

In accordance with features of the invention, the predefined performance metrics include a minimum voltage Vmin, a minimum voltage Vmax, a minimum voltage to maximum voltage gradient Min-max gradient, and Average Error AvgError.

In accordance with features of the invention, the identified optimal SP and sector locations minimize a voltage difference between a minimum voltage and a target voltage to ensure proper device operation.

In accordance with features of the invention, the identified optimal SP and sector locations provide a reduced gradient between a maximum voltage and a minimum voltage, minimizing a voltage difference between a minimum voltage, a target voltage, and a maximum voltage.

In accordance with features of the invention, the identified optimal SP and sector locations ensures uniform voltage distribution, minimizing average error.

In accordance with features of the invention, average error is represented by:

$$\text{AvgError} = \frac{\sum_{n=1}^{N} |Vn - Vtarget|}{N},$$

where N represents total number of nodes in the power grid, Vn=node voltage, and Vtarget=target voltage.

In accordance with features of the invention, customized cost function is represented by:

$$\min_{SP(X,Y)} (\alpha \text{Grad}_{vmin} + \beta \text{Grad}_{vmax} + \gamma \text{AvgErr})$$

$$\text{where, Grad}_{vmin} = |Vt - Vmin|, \text{Grad}_{vmax} = |Vmax - Vt|,$$

$$\text{AvgErr} = \frac{\sum_{n=1}^{N} |Vn - Vtarget|}{N}$$

And subject to Vmin>=Vmin threshold, Vmax<=Vmax threshold, AvgErr<=AvgErr threshold.

$\text{Grad}_{vmin}$, $\text{Grad}_{vmax}$, and AvgError vary depending on SP location while $\alpha$, $\beta$, $\gamma$ are user-defined weights that decide priority of objectives.

In accordance with features of the invention, the SP and sector locations are modified based on the optimization results and the regulator design is re-evaluated to compute new values of the performance metrics.

In accordance with features of the invention, the method enables voltage regulator design optimization, with minimal time and effort. The method also ensures regulation accuracy and efficiency under design constraints. The optimal sense locations reduce gradients and achieve uniform voltage distribution.

BRIEF DESCRIPTION OF THE DRAWINGS

The present invention together with the above and other objects and advantages may best be understood from the following detailed description of the preferred embodiments of the invention illustrated in the drawings, wherein:

FIGS. 3 and 4 illustrate example automated sense point optimization identifications in accordance with preferred embodiments.

DETAILED DESCRIPTION OF THE PREFERRED EMBODIMENTS

In the following detailed description of embodiments of the invention, reference is made to the accompanying drawings, which illustrate example embodiments by which the invention may be practiced. It is to be understood that other embodiments may be utilized and structural changes may be made without departing from the scope of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In accordance with features of the invention, a method and system are provided for implementing automated identification of optimal sense point and sector locations in various on-chip linear voltage regulator designs in accordance with preferred embodiments.

Figure 1:
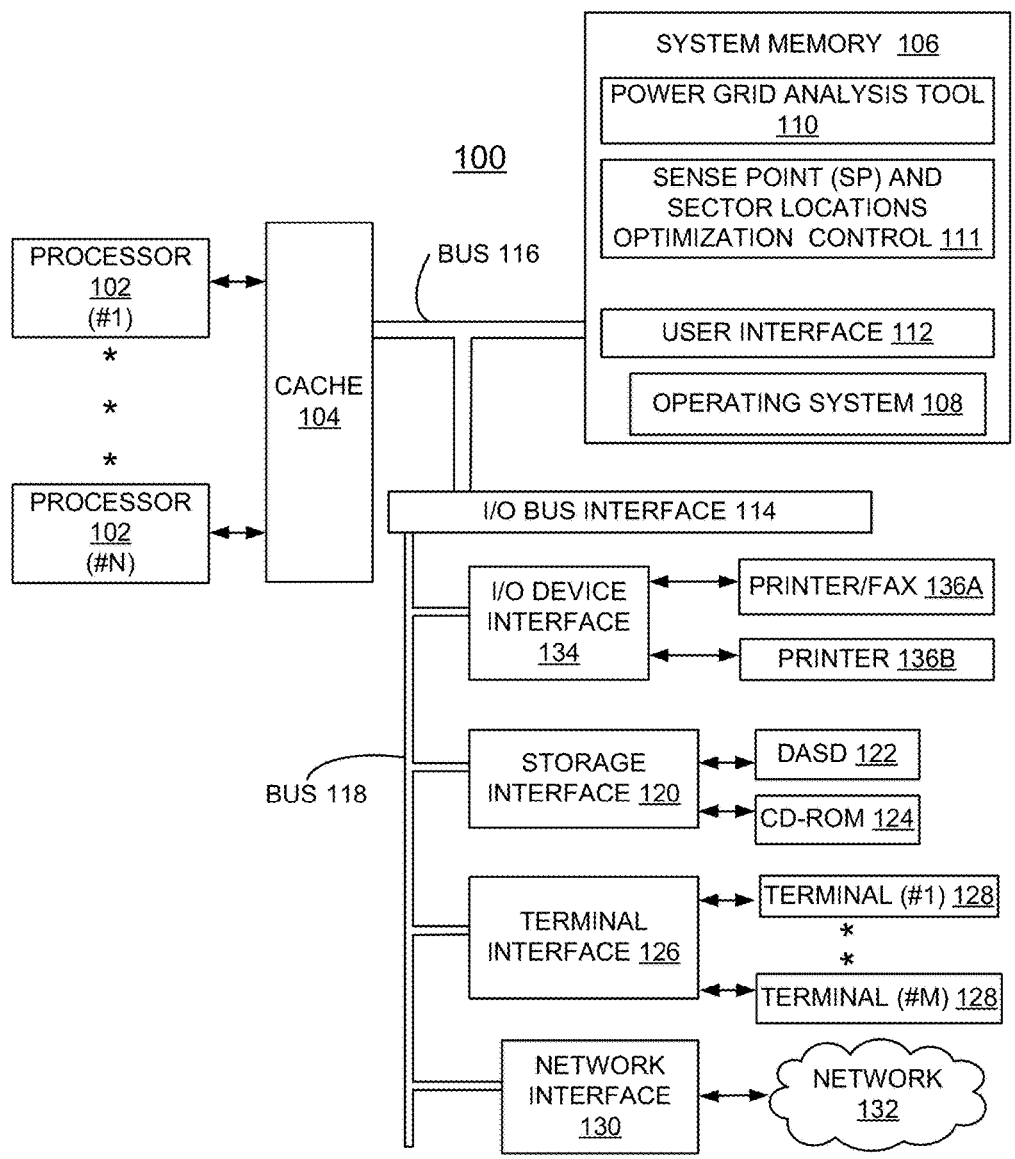
FIG. 1 is a block diagram of an example computer system for implementing automated identification of optimal sense point and sector locations in various on-chip linear voltage regulator designs in accordance with preferred embodiments.

Having reference now to the drawings, in FIG. 1, there is shown an example computer system generally designated by the reference character 100 for implementing automated identification of optimal sense point and sector locations in various on-chip linear voltage regulator designs in accordance with preferred embodiments. Computer system 100 includes one or more processors 102 or general-purpose programmable central processing units (CPUs) 102, #1-N. As shown, computer system 100 includes multiple processors 102 typical of a relatively large system; however, system 100 can include a single CPU 102. Computer system 100 includes a cache memory 104 connected to each processor 102.

Computer system 100 includes a system memory 106, an operating system 108, a power grid analysis tool 110 and a sense point (SP) and sector locations optimization control 111 in accordance with preferred embodiments of the invention and a user interface 112.

In accordance with features of the invention, the power grid analysis tool 110 and sense point (SP) and sector locations optimization control 111 are provided with a model of an on-chip voltage regulation module (VRM) to compensate for supply voltage variations, ensure precise regulation, and performance optimization.

In accordance with features of the invention, the power grid analysis tool 110 and sense point (SP) and sector locations optimization control 111, for example, use a customized cost function along with set performance metrics including Vmin, Vmax, Min-max gradient, and Average Error to identify optimal SP and sector locations, under user-defined design constraints. The SP and sector locations are modified based on optimization results and the regulator design is re-evaluated to compute new values of the performance metrics.

System memory 106 is a random-access semiconductor memory for storing data, including programs. System memory 106 is comprised of, for example, a dynamic random access memory (DRAM), a synchronous direct random access memory (SDRAM), a current double data rate (DDRx) SDRAM, non-volatile memory, optical storage, and other storage devices.

I/O bus interface 114, and buses 116, 118 provide communication paths among the various system components. Bus 116 is a processor/memory bus, often referred to as front-side bus, providing a data communication path for transferring data among CPUs 102 and caches 104, system memory 106 and I/O bus interface unit 114. I/O bus interface 114 is further coupled to system I/O bus 118 for transferring data to and from various I/O units. As shown, computer system 100 includes a storage interface 120 coupled to storage devices, such as, a direct access storage device (DASD) 122, and a CD-ROM 124. Computer system 100 includes a terminal interface 126 coupled to a plurality of terminals 128, #1-M, a network interface 130 coupled to a network 132, such as the Internet, local area or other networks, and a I/O device interface 134 coupled to I/O devices, such as a first printer/fax 136A, and a second printer 136B.

I/O bus interface 114 communicates with multiple I/O interface units 120, 126, 130, 134, which are also known as I/O processors (IOPs) or I/O adapters (IOAs), through system I/O bus 116. System I/O bus 116 is, for example, an industry standard PCI bus, or other appropriate bus technology.

Computer system 100 is shown in simplified form sufficient for understanding the present invention. It should be understood that the present invention is not limited to the illustrated arrangement of computer system 100.

In accordance with features of the invention, sense point (SP) and sector location provide a key factor that determines the regulation accuracy and efficiency. Optimal sense locations reduce gradients and achieve uniform voltage distribution. The present invention identifies optimal sense point and sector locations for any voltage regulation scheme, with minimal time and effort. Typically SP and sector locations are decided manually, based on user knowledge and experimentation, requiring significant experimentation during trial-and-error, optimal solution might not be reached.

Figure 2:
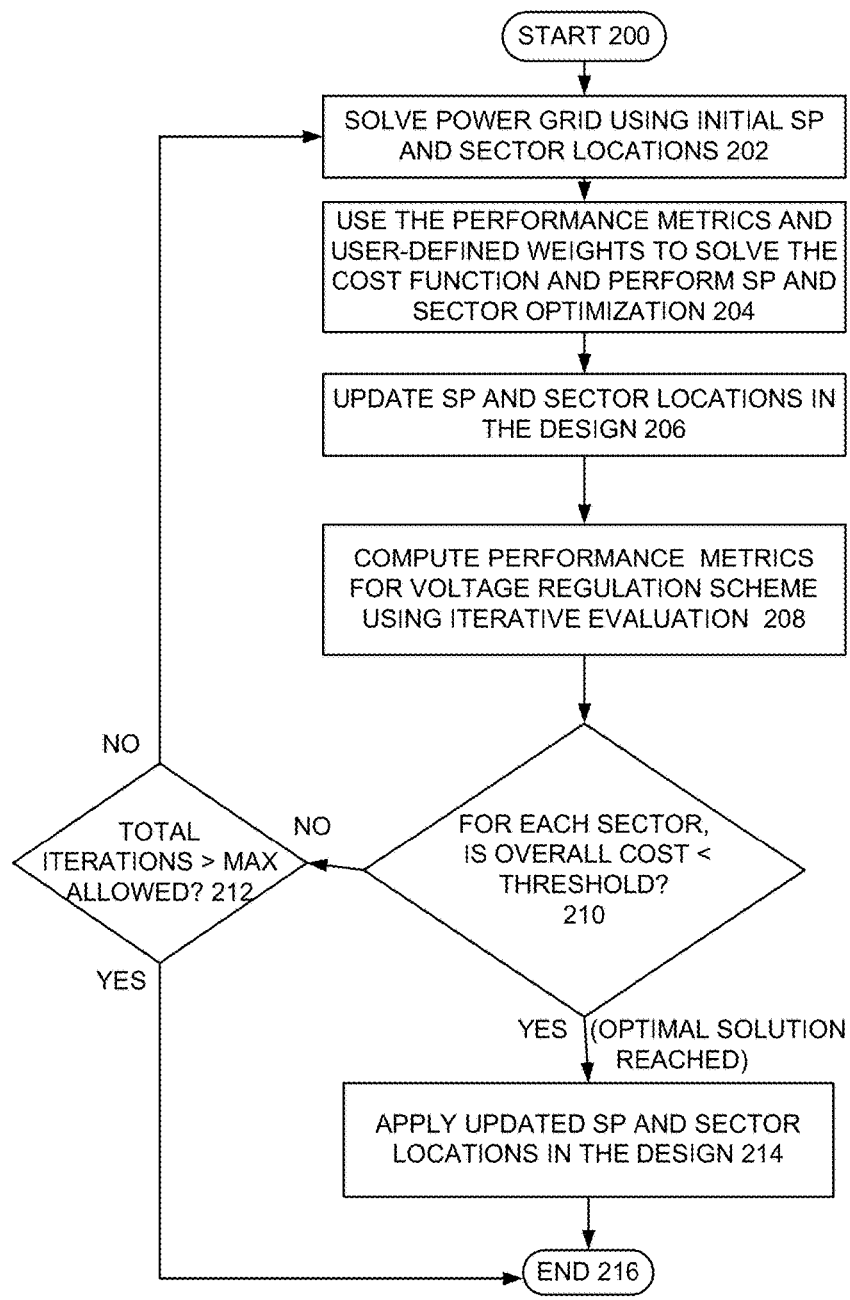
FIG. 2 is a flow chart illustrating example steps for automated identification of optimal sense point and sector locations in various on-chip linear voltage regulator designs in accordance with preferred embodiments.

Referring now to FIG. 2 is a flow chart illustrating example steps for automated identification of optimal sense point and sector locations in various on-chip linear voltage regulator designs in accordance with preferred embodiments starting at a block 200.

As indicated at a block 202, a power grid of the regulator design is solved using an initial SP and sector locations. Performance metrics and user-defined weights are used to solve a cost function and perform SP and sector optimization as indicated at a block 204. Objectives include 1) Keep Vmin close to Vtarget, to ensure proper device operation->Minimize difference between Vmin and Vtarget (Vt); 2) Reduce Min-max gradient->Minimize difference of Vtarget (Vt) with Vmin as well as Vmax; and 3) Ensure uniform voltage distribution->Minimize average error.

For example, a customized cost function is represented by:

$$\min_{SP(X,Y)} (\alpha \text{Grad}_{vmin} + \beta \text{Grad}_{vmax} + \gamma \text{AvgErr})$$

where, $\text{Grad}_{vmin} = |Vt - V\text{min}|$, $\text{Grad}_{vmax} = |V\text{max} - Vt|$, $$\text{AvgErr} = \frac{\sum_{n=1}^{N} |Vn - Vtarget|}{N}$$

subject to Vmin>=Vmin threshold, Vmax<=Vmax threshold, AvgErr<=AvgErr threshold.

$\text{Grad}_{vmin}$, $\text{Grad}_{vmax}$, and AvgError vary depending on SP location while $\alpha$, $\beta$, $\gamma$ are user-defined weights that decide priority of respective objectives. In accordance with features of the invention, average error is represented by:

$$\text{AvgError} = \frac{\sum_{n=1}^{N} |Vn - Vtarget|}{N},$$

where N represents total number of nodes in the power grid, and where Vn=node voltage and Vtarget=target voltage.

The identified results of SP and sector optimization in the design are updated in the design as indicated at a block 206. Performance metrics for the voltage regulation scheme are computed using iterative evaluation as indicated at a block 208. Checking is performed whether the overall cost is less than a defined threshold for each sector as indicated at a decision block 210. When the overall cost is not less than a defined threshold for each sector, checking if the total iterations is greater than a maximum iterations allowed is performed, as indicated at a decision block 212. When the total iterations is not greater than a maximum iterations allowed, operations return to block 202 and are repeated. When determined at decision block 210 that the overall cost is less than a defined threshold for each sector indicating an optimal solution reached, the updated optimal SP and sector locations are applied in the regulator design as at a block 214. When the total iterations is greater than a maximum iterations allowed, and after the updated optimal SP and sector locations are applied in the regulator design, then operations end at a block 216.

Figure 3:
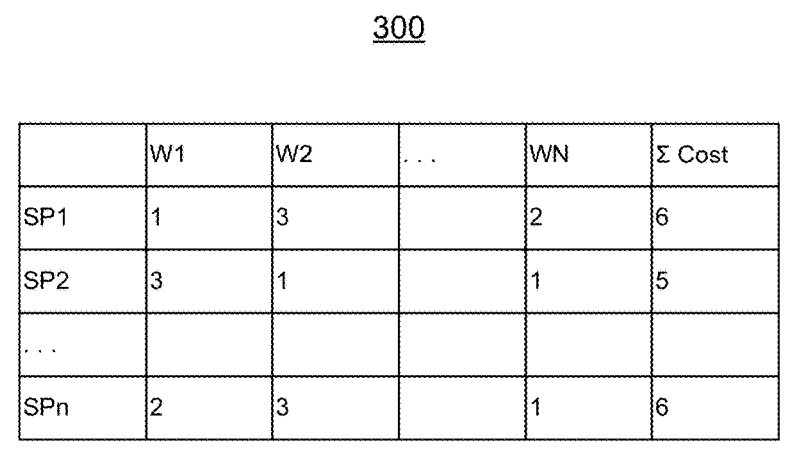
Figure 4:
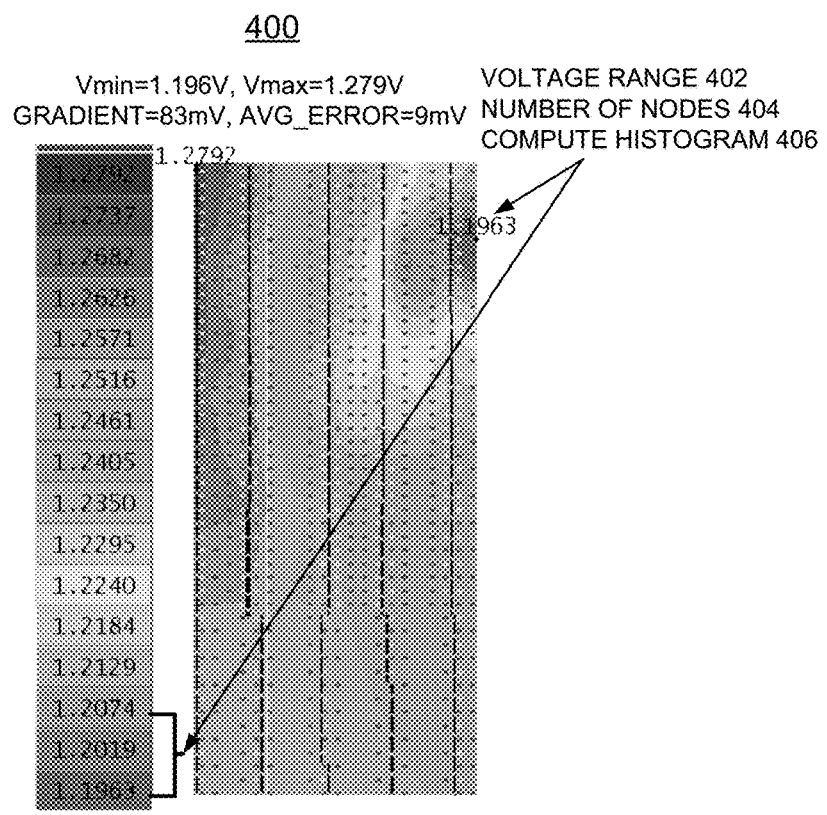

Referring now to FIGS. 3 and 4, example automated sense point optimization identifications are shown in accordance with preferred embodiments. In FIG. 3, optimization for multiple workloads is shown in accordance with preferred embodiments. As shown in FIG. 3, a table generally designated by reference character 300 includes a plurality of sense points SP1, SP2, SPn together with multiple workloads W1, W2, WN and cost summation Σ cost, such that n<=N. Optimization for multiple workloads includes 1) identifying optimal location for each workload using iterative evaluation technique and optimization method shown in FIG. 2. The identified optimal locations are combined to form a multi-sense (SSMS) scheme, and SPs are eliminated based on overlap or physical proximity, if possible. Then a minimum number of SPs are identified, using the cost function, cost for the particular SP is calculated for each workload. Lower cost implies better performance. So in the example table 300, SP1 is optimal for Workload 1, SP2 for W2 and the like. The sigma cost provides cost for SP over the entire set of workloads (sum of costs for each workload). Ideally, number of SPs would be equal to number of workloads (n=N), one optimal for each workload. To reduce number of SPs, identify the minimum set of SPs from example table 300 that satisfy certain overall cost constraint (threshold) while providing sufficient coverage for the workloads.

In FIG. 4, SP optimization is shown in accordance with preferred embodiments. As shown in FIG. 4, an example contour plot generally designated by reference character 400 includes multiple voltage ranges 402 and a number of nodes 404 used to compute a histogram 406. For example, the illustrated contour plot 400 includes a minimum voltage Vmin=1.196V, a maximum voltage Vmax=1.279V, a gradient=83 mV, and average error AVG_ERROR=9 mV. The power-grid analysis tool 110 computes voltage at thousands/millions of nodes on the regulated area, providing the example contour plot 400. Each slice of a computed histogram 406 representing a voltage range and the nodes that occupy that range.

The histogram slices are used to allow and disallow groups of nodes as potential SP locations. For example, $\alpha \sim 1$ implies highest priority for making Vmin=Vt. So, nodes are disallowed from all slices of histogram except the top slice as candidates for SP placement. User defined weights $\alpha$, $\beta$, $\gamma$ are used to get ranges of flexibility for Vmax, Vmin and AvgErr to always have some nodes available for selection as SP locations.

Optimal sector groupings are identified using, for example, three possible methods. A top down method which is similar to algorithms for circuit partitioning includes 1) Start with two initial groupings (sectors) of header circuits; 2) Move/swap headers (or modify sector boundaries) based on voltage gradients; and 3) Split the sectors if internal gradients exceed thresholds. A bottom up method (header aggregation using convex hulls) includes 1) Start with single header in sector and compute average voltage of nodes around that header; 2) Compare this average with neighboring headers and based on gradient either decide to expand sector or form separate sector; and 3) Continue process until all headers belong to a sector. A third method using histogram and objective weights includes, if possibility of split-sectors is tolerated, headers being grouped based on information from histogram slices combined with insights from objective weights and header locations; for example, a possible sector grouping for $\alpha \sim 1$ is selected, and the objective weights decide the number of sectors.

In brief, the method of the invention enables voltage regulator design optimization, with minimal time and effort and also ensures regulation accuracy and efficiency under design constraints.

Figure 5:
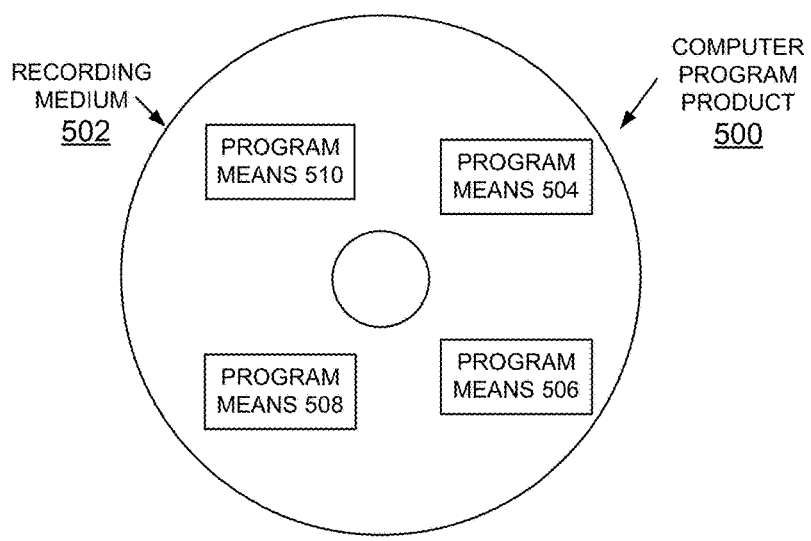
FIG. 5 is a block diagram illustrating a computer program product in accordance with the preferred embodiment.

Referring now to FIG. 5, an article of manufacture or a computer program product 500 of the invention is illustrated. The computer program product 500 is tangibly embodied on a non-transitory computer readable storage medium that includes a recording medium 502, such as, a floppy disk, a high capacity read only memory in the form of an optically read compact disk or CD-ROM, a tape, or another similar computer program product. Recording medium 502 stores program means 504, 506, 508, and 510 on the medium 502 for carrying out the methods for implementing automated identification of optimal sense point and sector locations in various on-chip linear voltage regulator designs in system 100 of FIG. 1.

A sequence of program instructions or a logical assembly of one or more interrelated modules defined by the recorded program means 504, 506, 508, and 510, direct the computer system 100 for implementing automated identification of optimal sense point and sector locations in various on-chip linear voltage regulator designs in accordance with the preferred embodiments.

While the present invention has been described with reference to the details of the embodiments of the invention shown in the drawing, these details are not intended to limit the scope of the invention as claimed in the appended claims.

What is claimed is:

1. A method for implementing automated identification of optimal sense point (SP) and sector locations in an on-chip linear voltage regulator design in a computer system including a processor; a power grid analysis tool; and a sense point (SP) and sector locations optimization control, said method comprising:
    solving a power grid for an on-chip linear voltage regulator design;
    calculating and solving a customized cost function with predefined performance metrics in the on-chip linear voltage regulator design under user-defined design constraints;
    performing SP and sector locations optimization to identify optimal SP and sector locations in the on-chip linear voltage regulator design;
    updating said SP and sector locations in the on-chip linear voltage regulator design based on identified optimization results;
    applying the updated SP and sector locations to the on-chip linear voltage regulator design to provide enhanced regulator performance and ensure proper operation; and
    wherein solving a customized cost function with predefined performance metrics under user-defined design constraints includes using predefined performance metrics including a minimum voltage Vmin, a minimum voltage Vmax, a minimum voltage to maximum voltage gradient Min-max gradient, and Average Error AvgError to solve the customized cost function.

2. The method as recited in claim 1 wherein solving a power grid for an on-chip linear voltage regulator design includes computing voltage on nodes of a regulated area, calculating a histogram identifying a respective voltage range with a number of nodes occupying the respective voltage range.

3. The method as recited in claim 2 includes using the calculated histogram to allow and disallow groups of nodes as potential SP locations.

4. The method as recited in claim 1 wherein the user-defined design constraints include user-defined weights providing priority of respective cost function objectives.

5. The method as recited in claim 4 wherein said respective cost function objectives include minimizing a voltage difference between one of a minimum voltage and a maximum voltage, and a target voltage to ensure proper device operation.

6. The method as recited in claim 4 wherein said respective cost function objectives include providing a reduced gradient between a maximum voltage and a minimum voltage, minimizing a voltage difference between a minimum voltage, a target voltage, and a maximum voltage.

7. The method as recited in claim 1 wherein said respective cost function objectives include minimizing average error to ensure uniform voltage distribution.

8. The method as recited in claim 1 includes modifying said SP and sector locations based upon the optimization results, and reevaluating a linear voltage regulator design with calculating new values of the performance metrics.

9. A computer system for implementing automated identification of optimal sense point (SP) and sector locations in an on-chip linear voltage regulator design comprising:
    a processor;
    a power grid analysis tool;
    a sense point (SP) and sector locations optimization control;
    said processor using said power grid analysis tool and said SP and sector locations optimization control to implement automated identification of optimal sense point (SP) and sector locations in an on-chip linear voltage regulator design;
    said processor using a customized cost function with predefined performance metrics to identify optimal SP and sector locations in the on-chip linear voltage regulator design under user-defined design constraints;
    said processor updating said SP and sector locations in the on-chip linear voltage regulator design based on identified optimization results, and applying the updated SP and sector locations to the on-chip linear voltage regulator design to provide enhanced regulator performance and ensure proper operation; and
    wherein solving a customized cost function with predefined performance metrics under user-defined design constraints includes using predefined performance metrics including a minimum voltage Vmin, a minimum voltage Vmax, a minimum voltage to maximum voltage gradient Min-max gradient, and Average Error AvgError to solve the customized cost function.

10. The system as recited in claim 9 includes control code stored on a non-transitory computer readable medium, and wherein said processor uses said control code for implementing automated identification of optimal sense point (SP) and sector locations.

11. The system as recited in claim 9 wherein said processor using said power grid analysis tool and said SP and sector locations optimization control to implement automated identification of optimal sense point (SP) and sector locations includes solving a power grid for a linear voltage regulator using initial SP and sector locations.

12. The system as recited in claim 9 wherein the user-defined design constraints include user-defined weights providing priority of respective cost function objectives.

13. The system as recited in claim 9 wherein said respective cost function objectives include minimizing a voltage difference between one of a minimum voltage and a maximum voltage, and a target voltage to ensure proper device operation.

14. The system as recited in claim 9 wherein said respective cost function objectives include providing a reduced gradient between a maximum voltage and a minimum voltage, minimizing a voltage difference between a minimum voltage, a target voltage, and a maximum voltage.

15. The system as recited in claim 9 wherein said respective cost function objectives include minimizing average error to ensure uniform voltage distribution.

16. The system as recited in claim 9 wherein said processor using the customized cost function with predefined performance metrics to identify optimal SP and sector locations under user-defined design constraints includes computing performance metrics for an on-chip linear voltage regulator design using iterative evaluation.

17. The system as recited in claim 9 includes said processor using the customized cost function with predefined performance metrics to identify optimal SP and sector locations under user-defined design constraints includes modifying said SP and sector locations based upon the optimization results, and reevaluating a linear voltage regulator design with calculating new values of the performance metrics.

18. The system as recited in claim 9 includes said processor applying the updated SP and sector locations to an on-chip linear voltage regulator design ensures regulation accuracy and efficiency under the user-defined design constraints.

\* \* \* \* \*